United States Patent [19]
Schmid

[11] Patent Number: 5,796,882
[45] Date of Patent: Aug. 18, 1998

[54] ACOUSTO-OPTICAL WAVEGUIDE DEVICE, TUNABLE, WITH A POLARIZATION INDEPENDENT RESPONSE, AND A METHOD FOR THE ACOUSTO-OPTICAL PROCESSING OF OPTICAL SIGNALS

[76] Inventor: Steffen Schmid, Via Bellani, 2 - 20052 Monza (Milano), Italy

[21] Appl. No.: 679,731

[22] Filed: Jul. 12, 1996

[30] Foreign Application Priority Data

Aug. 2, 1995 [IT] Italy .................. MI95 A 001699

[51] Int. Cl.$^6$ ............................................. G02B 6/10
[52] U.S. Cl. ..................... 385/11; 385/9; 385/7
[58] Field of Search ..................... 385/8, 9, 10, 11, 385/14, 16, 20, 21, 7

[56] References Cited

U.S. PATENT DOCUMENTS

| | | |
|---|---|---|
| 5,002,349 | 3/1991 | Cheung et al. |
| 5,218,653 | 6/1993 | Johnson et al. ............... 385/11 |
| 5,611,004 | 3/1997 | Chang et al. ............... 385/11 |

OTHER PUBLICATIONS

IEEE Photonics Technology Letters, Nov. 1994, USA, vol. 6, No. 11, ISSN 1041-1135, pp. 1335-1337.

*Primary Examiner*—John Ngo
*Attorney, Agent, or Firm*—Brooks Haidt Haffner & Delahunty

[57] ABSTRACT

An acousto-optical waveguide device, tunable, with a polarization independent response, comprises a substrate in a birefringent and photoelastic material, on which there are obtained at least one stage of polarization mode conversion of two separate polarization components of an optical signal, a first and a second polarization selective element, placed upstream and downstream, respectively, of the conversion stage and at least one compensation stage for the polarization mode conversion, wherein at least one optical waveguide transmits the two polarization components in a combined form.

A method for the acousto-optical switching of optical signals is based on two conversions of the polarization components of an optical signal, transmitted separate and not separate, respectively, by acousto-optical interactions with two acoustic waves.

17 Claims, 2 Drawing Sheets

ACOUSTO-OPTICAL WAVEGUIDE DEVICE, TUNABLE, WITH A POLARIZATION INDEPENDENT RESPONSE, AND A METHOD FOR THE ACOUSTO-OPTICAL PROCESSING OF OPTICAL SIGNALS

The present invention relates to an acousto-optical waveguide device, tunable, with a polarization independent response, and a method for the acousto-optical processing of optical signals.

In telecommunications networks with wavelength-division multiplexing, several optical transmission signals, independent one from the other, or several channels, are transmitted in the same line, usually consisting of an optical fiber, by means of wavelength multiplexing, that is the simultaneous transmission of signals at different wavelengths by means of frequency division. The transmitted signals, or channels, can be either digital or analog and they are distinguished one from the other since each of them is associated with a specific wavelength. Inside the networks there are nodes wherein the signals are switched from optical fiber lines that come together at an optical fiber line node to optical fiber lines that branch out from the node. In order to address the signals inside a node, simplifying its architecture, it is possible to use wavelength selective optical switches. At the output of the networks, in order to separate the individual signals again, filters are needed that are capable of transmitting a wavelength band centered on the wavelength of a signal and sufficiently narrow to block adjacent signals.

Integrated acousto-optical devices are known whose operation is based on the interactions between light signals, propagating in waveguides obtained on a substrate of a birefringent and photoelastic material, and acoustic waves propagating at the surface of the substrate, generated through suitable transducers. The interaction between a polarized optical signal and an acoustic wave produces a polarization conversion of the signal, that is, the rotation of the polarization of its TE (transversal electric) and TM (transversal magnetic) components.

In such acousto-optical devices, by controlling the frequency of the optical waves it is possible to tune the spectral response curve of the devices, which makes them suitable for being used as switches and as optical filters of the signals in optical telecommunication networks with wavelength-division multiplexing. These tunable switches and filters allow the selection of the signals to be changed and, thus, to reconfigure a network, without altering the cabling of the components.

These acousto-optical devices also allow the switching and simultaneous selection of different signals or channels, if the acoustic wave propagating at the surface of the substrate is the superimposition of different acoustic waves. In fact, the switches execute the combined switching of the signals at the wavelengths corresponding to the simultaneously applied frequencies and the filters have a passband corresponding to the set of different ranges of wavelengths, determined by the frequencies of the acoustic waves.

Pohlmann et al. in IEEE Journal of Quantum Electronics (Vol. 27, No. 3, pages 602–607, March 1991) describe an acousto-optical waveguide device, with wavelength selection, acoustically tunable, with a polarization independent response, that can be used as a switch with two inputs and two outputs (2×2) and as a filter.

The switch, shown in FIG. 4 of the article, comprises a substrate consisting of a crystal of lithium niobate ($LiNbO_3$), x-cut and with a y-propagation, two parallel optical waveguides, two passive polarization splitters, an electro-acoustic transducer, an acoustic waveguide and acoustic absorbers. The optical waveguides and the electro-acoustic transducer form an acousto-optical mode conversion stage. The electro-acoustic transducer is formed by interdigital electrodes capable of generating a radio-frequency (RF) surface acoustic wave with a central frequency of 180 MHz. The acoustic waveguide has a width of 150 microns and contains both optical waveguides. The acoustic absorbers are used to eliminate reflections of the acoustic wave and freely propagating waves.

The optical waveguides and the polarization splitters are formed by diffusion of titanium in the substrate and the channel of the acoustic waveguide is also formed by diffusion of titanium in circumscribing regions. The interdigital electrodes of the electro-acoustic transducer are formed through deposition by cathodic spraying of tin oxide and indium oxide.

D. A. Smith et al. in Applied Physics Letters (Vol. 56, No. 3, pages 209–211, January 1990) describe an acoustically tunable optical filter with polarization independent response, of the same type as the device of Pohlmann et al. The filter by D. A. Smith et al. is made in a crystal of lithium niobate, x-cut and with a y-propagation, 5 cm long and comprises two optical waveguides, spaced by 27 microns, an electro-acoustic transducer, consisting of interdigital electrodes, and two polarization splitters, consisting of directional couplers.

D'Alessandro et al. in IEEE Photonics Technology Letters (Vol. 6, No. 3, pages 390–393, March 1994) describe an acousto-optical switch of the same type as the device of Pohlmann et al. The switch of D'Alessandro et al. is made in an XY crystal of lithium niobate, 5 cm long, and comprises two optical waveguides, an electro-acoustic transducer, an acoustic waveguide, wherein the optical waveguides are contained, and two passive polarization separators formed by means of protonic exchange/titanium diffusion and annealing. The switch operates with four signals having wavelength spaced out by 4 nm between 1546 nm and 1558 nm and four pilot radio frequencies having values of 175.89 MHz, 175.38 MHz, 174.86 MHz, 174.42 MHz, to select the four optical wavelengths.

John J. Johnson et al. in U.S. Pat. No. 5,218,653 describe an acousto-optical device similar to that of D'Alessandro et al. (FIG. 2).

The acousto-optical devices described above operate as tunable 2×2 switches, with a polarization independent response.

If a channel at a given wavelength is selected, the optical signals at that wavelength, entering through an input, are addressed to the corresponding cross-state output and those entering through the other input are addressed to the corresponding other cross-state output (switch in the cross-state). The non-selected signals are addressed from one input to the corresponding direct output (switch in direct transmission, bar-state).

These devices operate as tunable passband acousto-optical filters, with a polarization independent response in the cross-state switching condition, wherein only one input is used together with the corresponding cross-state output.

Several drawbacks occur in the devices described above.

The devices consist of a single stage of acousto-optical conversion. In such a single stage the polarization conversion due to interaction between the optical signal and the acoustic control wave in the two optical waveguides is accompanied by a frequency shift having a value equal to the frequency of the acoustic wave. Such a frequency shift, in the described configuration, has an opposite sign depending on the polarization of the optical signal and, thus, the two separate orthogonal polarization components have a positive and a negative shift, respectively.

The frequency shift of the optical signal from the acoustic conversion frequency can generate beat problems in telecommunications networks.

In order to limit the frequency shift of the two polarizations in the two optical waveguides, acousto-optical devices have been proposed wherein with each optical waveguide there is associated a respective acoustic waveguide.

H. Herrmann et al. in Proceedings 6th European Conference on Integrated Optics, pages 10.1–10.3, April 1993 (ECIO '93, Neuchatel, Switzerland) describe a 2×2 acousto-optical switch (FIG. 10) comprising two optical waveguides and two acoustic waveguides side by side, in each of which there is included an optical waveguide and wherein the surface acoustic waves are propagated in opposite directions.

John J. Johnson et al. in U.S. Pat. No. 5,218,653 describe an acousto-optical device similar to that of H. Herrmann et al. (FIG. 3).

An acousto-optical device of the type described by H. Herrmann et al. has been made by the Applicant. In this device two optical waveguides were connected to two polarization splitters with polarization mode coupling, connected to the waveguides with respective portions curved into an "S", and two acoustic waveguides each contained a respective optical waveguide. With each acoustic waveguide there was associated an electro-acoustic transducer, formed by interdigital electrodes. The two optical waveguides were about 18 mm long and spaced by 270 microns, the polarization splitters were about 5 mm long, the portions curved into an "S" were about 8 mm long with a radius of curvature of about 160 mm. The overall length of the device was about 60 mm.

With the device in the OFF state (direct transmission), total losses were detected of about 2 dB for the TM input and of 5 dB for the TE input, resulting in a polarization dependent loss (PDL) of 3 dB, due to the presence of four portions curved into an "S" for the connection of each polarization splitter. The crosstalk with respect to the completely crossed state ranged from −18 dB to −20 dB, in relation to the splitting ratio of the polarization splitters.

With the device in the ON state (cross-state), total losses of about 2 dB for the TM input and of 3 dB for the TE input were detected. The polarization dependent loss is lower due to the distribution of the switching losses on both polarizations.

The switching characteristic had a bandwidth of 2.0 nm and a first side lobe of −20 dB. The conversion efficiency was greater than 99% (for both optical waveguides considered separately). For an input signal polarized at 45° with respect to the normal to the surface of the substrate, the extinction ratio of the device was limited to about −16 dB, both as an effect on acoustic cross-coupling of the order of −17 dB of the coupled acoustic power, and as the average (total) conversion efficiency was reduced to about 80% due to the mismatch of the conversion wavelength from 0.2 nm to 0.5 nm.

In particular, it is seen that a certain component of the acoustic wave propagating in an acoustic waveguide interferes with the optical signal propagating in the side-by-side optical waveguide. This has involved an increase in the interport crosstalk in the direct transmission state of about −18 dB.

In addition, the frequency shift, or mismatch, of the optical signal can have an absolute value that is different in the two optical waveguides, due to lack of homogeneity of the substrate. In fact, the material of the substrate and the material that defines the optical waveguides can have a non-perfectly uniform birefringence, also due to imperfections during manufacturing, such as non-uniform thickness and/or width of the deposited layer of titanium or gradient in the diffusion temperature of the titanium layer. Small local variations in birefringence cause a difference in the peak wavelength switched between the two optical waveguides that is greater the greater the distance between the same waveguides.

In order to compensate for the frequency shift that occurs in the acousto-optical devices with a single conversion stage, acousto-optical devices have been proposed with two conversion stages arranged in series.

Kwok-Wai Cheung et al. in the U.S. Pat. No. 5,002,349 describe an acousto-optical device comprising two acousto-optical conversion stages in series and two waveguide polarization splitters arranged upstream and downstream of each stage. Each stage is provided with an electro-acoustic transducer.

The Applicant has observed that the attenuation to which the optical signals are subjected in passing through such a device is about twice that observed in a single-stage device, following the four passages for the polarization splitters.

In addition, the overall length of the device is at least twice that of a single-stage device, reaching a critical size with respect to the size of the commonly-used lithium niobate substrates.

One aspect of the present invention is constituted by an acousto-optical waveguide device, selective in wavelength, independent of the polarization, comprising a substrate in a birefringent and photoelastic material, on which there are obtained:

a) at least one polarization mode conversion stage of an optical signal in a preselected range of wavelengths, including
   a1) a first and a second optical waveguide substantially parallel to one another and placed at a preselected distance,
   a2) first generating means of an acoustic surface wave associated with said first and second optical waveguide and
   a3) a first acoustic waveguide containing at least one portion of said first and second optical waveguide,
   a4) each of said first and second optical waveguide being capable of receiving one of two mutually orthogonal polarization components of said optical signal and being capable of emitting a respective component of orthogonal polarization,
b) a first and a second polarization selective element placed upstream and downstream, respectively, of said conversion stage and optically connected to said first and second waveguide in order to transmit said two polarization components separately;

characterized in that in said substrate there is also obtained
c) at least one compensation stage for the conversion of the polarization mode of said optical signal in said preselected range of wavelengths including
   c1) at least one third optical waveguide optically connected to one of said first and second polarization selective element,
   c2) second generating means of an acoustic surface wave associated with said third optical waveguide, and
   c3) a second acoustic waveguide containing at least one portion of said third optical waveguide, c4) wherein said third optical waveguide is connected serially to said conversion stage of the polarization mode, and c5) said third optical waveguide guides said two polarization components in a combined form.

According to a preferred embodiment, said compensation stage further includes d) a fourth optical waveguide substantially parallel to said third optical waveguide and placed at a preselected distance from it, d1) said fourth optical waveguide being optically connected to one of said first and second polarization selective element, d2) said second generating means of an acoustic surface wave being associated with said fourth optical waveguide, d3) said second acoustic waveguide containing at least one portion of said fourth optical waveguide, d4) said third and fourth optical waveguide being connected to respective optical access waveguide branches separated and spaced at least by the amount of said third and fourth optical waveguide so that each of said third and fourth optical waveguide guides said two polarization components in a combined form.

Preferably, said first and second optical waveguide and said third and fourth optical waveguide are spaced by about 40 microns.

According to another preferred embodiment, at at least one of said compensation stage and conversion stage, adjustment elements are applied to said substrate capable of varying the temperature of at least one of said compensation and conversion stages, in order to compensate for the non-homogeneous birefringence of the material of said substrate and of said optical waveguides and to correct errors of acousto-optical interactions.

A second aspect of the invention is constituted by a method of acousto-optical switching of an optical signal, comprising the steps of separating the polarization components of an optical signal into two different waveguide paths;

converting the separated polarizations of said signal in both said paths by means of acousto-optical interaction with a first common acoustic wave;

combining said polarizations of said optical signal;

characterized in that, serially with said steps, it comprises a further step of conversion of the non separated polarizations of said optical signal by means of acoustic interaction with a second common acoustic wave, said second acoustic wave having a frequency equal to said first acoustic wave.

The acoustic device according to the invention can be used as a 2×2, 1×2 and 2×1 switch, tunable, with polarization independent response, or as a tunable filter, with polarization independent response.

The compensation stage of the device according to the present invention allows the compensation of the frequency shift that occurs in the conversion stage, to be executed by operating on the polarization components in a combined form. This allows an acousto-optical device to be made with a very simple and functional architecture. Together with a simplified architecture, the device has an overall length that is very limited, about 40 mm, actually only just larger than that of a device comprising the conversion stage only and the two polarization selective elements together with the corresponding curvatures.

With the device of the present invention a wavelength mismatch is attained that is very low, less than 0.1 nm. This reduces the interport crosstalk at the direct transmission state (bar-state) to <−20 dB. This is due to the presence of one acoustic waveguide only, which avoids acoustic crosstalk, and to the proximity of the optical waveguides (a distance of about 40 microns), with a very low wavelength mismatch.

In addition, such an effect can be further improved with the use of adjustment elements capable of varying the temperature of the conversion and of the compensation stages for tuning the corresponding frequency shifts of the two stages. Thus, the negative effects of a possible non-homogeneous birefringence of the substrate and a non-uniformity of the waveguide parameters are minimized. In addition, the presence of a single acoustic guide in the two stages avoids a phenomenon of acoustic coupling between the two optical waveguides, that would penalize the extinction ratio of the polarization selective elements. The extinction ratio of each polarization selective element of the device according to the invention is about −25 dB.

The device has very low insertion losses and polarization dependent losses (PDL). Maximum total losses of 3 dB have been observed.

Features and advantages of the invention will now be illustrated with reference to embodiments of the invention represented as non-limiting examples in the enclosed drawings, wherein.

Figure 1:
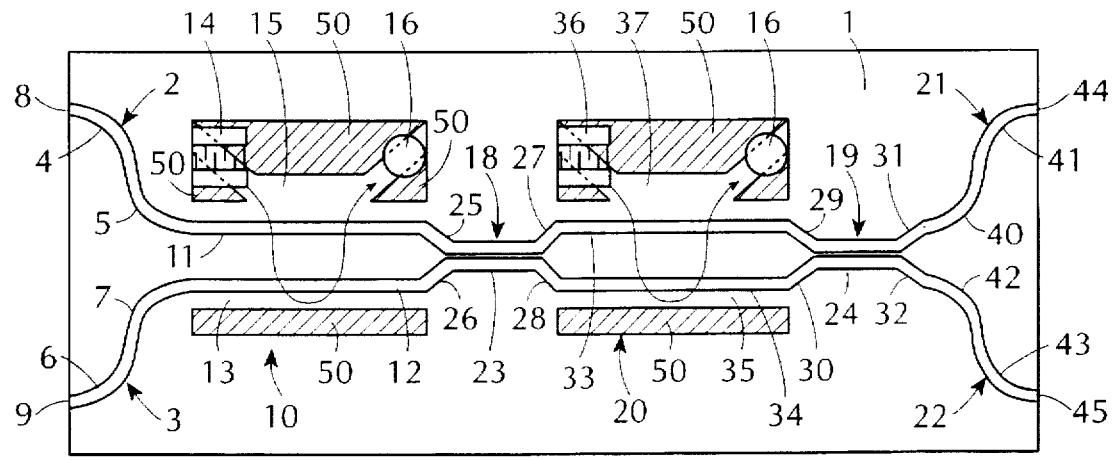
FIG. 1 is a diagrammatic representation of a 2×2 acousto-optical switch, tunable, with a polarization independent response, made according to the invention.

There is shown in FIG. 1 a 2×2 acousto-optical switch, tunable, with a polarization independent response, made according to the invention. The switch comprises a substrate 1 of a birefringent and photoelastic material, consisting of lithium niobate (LiNbO₃).

There are obtained in the substrate 1 two optical waveguide input branches 2 and 3, each comprising two portions curved with opposite convexity, 4, 5 and 6, 7, respectively. The portions 4 and 6 form two input ports 8 and 9, capable of being connected to optical fibers of a telecommunications network through connecting devices, not shown. With the object of allowing the connection of said optical fibers (with a diameter of some 250 microns) the ports 8 and 9 are spaced by at least 125 micron. The portions 4 and 6 start out spaced by about 250 microns and the portions 5 and 7 end up spaced by about 40 microns. The curved portions 4, 5, 6 and 7 have a radius of curvature of about 100–180 mm.

There is obtained in the substrate 1 a compensation stage 10 comprising two parallel optical waveguide branches 11 and 12, connected to the portions 5 and 7, an acoustic waveguide 13, containing the branches 11 and 12, and an electro-acoustic transducer 14, formed by interdigital electrodes, capable of generating a radio-frequency surface acoustic wave. The transducer 14 is placed in an acoustic waveguide 15, side by side and communicating with the acoustic waveguide 13, so as to form an acoustic coupler. Said acoustic coupler is made so that the intensity profile of the surface acoustic wave along the waveguide 15 has a peak in the central portion of said guide and two troughs at the ends of the same guide. Optical signals propagating along the branches 11 and 12 interact with an acoustic wave having an intensity increasing up to halfway along the path and decreasing in the other half in an area having a preselected interaction length. At ends of the acoustic waveguide 15 there are acoustic absorber means 16 capable of eliminating reflections of the acoustic wave. The acoustic waveguides 13 and 15 are circumscribed by areas 50 wherein the speed of the acoustic waves is higher than in the waveguides 13 and 15.

In the substrate 1 there are also obtained two polarization selective elements 18 and 19, one conversion stage 20 and two optical output waveguide branches 21 and 22.

The polarization selective elements 18 and 19 are formed by evanescent wave polarization splitters, or directional couplers, each comprising a central optical waveguide 23 and 24, respectively, and pairs of input and optical output waveguides 25, 26, 27, 28 and 29, 30, 31, 32, respectively.

The conversion stage 20 comprises two parallel optical waveguide branches 33 and 34, connected to the pair of output guides 27 and 28 of the polarization splitter 18 and to the pair of input waveguides 29 and 30 of the polarization splitter 19, one acoustic waveguide 35, containing the branches 33 and 34 and an electro-acoustic transducer 36, formed by interdigital electrodes, capable of generating a radio frequency surface acoustic wave. The transducer 36 is placed in an acoustic waveguide 37 side by side and communicating with the acoustic waveguide 35, so as to form an acoustic coupler. At ends of the acoustic waveguide 35 there are acoustic absorbers 16. The acoustic waveguides 35 and 37 are circumscribed by areas 50 wherein the speed of the acoustic waves is higher than in the guides 35 and 37.

The two optical output waveguide branches 21 and 22, each comprise two portions curved with opposite convexity, 40, 41 and 42, 43, respectively. The portions 40 and 42 are connected to the optical output waveguides 31 and 32 of the polarization splitter 18. The portions 41 and 43 form two output ports 44 and 45, capable of being connected with optical fibers of a telecommunications network, not shown. The portions 40 and 42 start out spaced by about 40 microns and the portions 41 and 43 end up spaced by about 250 microns. The curved portions 40, 41, 42, 43 have a radius of curvature of about 100–180 mm.

The branches 11 and 12 and the branches 33 and 34 are placed at a distance of about 40 microns. The width of the acoustic waveguides 15 and 35 is about 110 microns.

The operation of the switch according to the invention is as follows.

When no voltage is applied across the electro-acoustic transducers 14 and 36, the switch is off (off-state) and it is in a condition of direct transmission (bar-state) wherein there is a direct correspondence between the input ports 8 and 9 and the output ports 44 and 45, respectively. The light signals enter through ports 8 and 9 and they are transmitted by the branches 11 and 12 of the compensation stage 10 with the combined TE (transversal electric) and TM (transversal magnetic) polarization components. The signals then enter the polarization splitter 18 where the polarization components TE and TM are separated in the waveguides 27 and 28, they pass unaltered through the branches 33 and 34 of the conversion stage 20 and they are then separated in the waveguides 31 and 32 of the polarization splitter 19, so that the signals entering through ports 8 and 9 exit unchanged through ports 44 and 45.

Applying an appropriate switching signal across the electrodes of the transducers 14 and 36, the switch is on (on-state) and moves to a condition of cross-transmission (cross-state), wherein the input ports 8 and 9 are in correspondence with the crossed output ports 45 and 44, respectively. The transducers 14 and 36 generate a respective radio-frequency surface acoustic wave having a driving acoustic frequency $f_{ac}$ (about 174±10 MHz for devices operating at 1550 nm and 210±10 MHz for those operating at 1300 nm) corresponding to the optical resonance wavelength, at which the polarization conversion TE->TM or TM->TE takes place. The light signals enter with the combined polarization components TE and TM into the branches 11 and 12 of the compensation stage 10 and they are transformed into the corresponding orthogonal components, remaining combined. The signals enter the polarization splitter 18 where the polarization components TE and TM are separated and pass through the branches 33 and 34 of the conversion stage 20 where they are reconverted into the original polarization state. The polarization components TE and TM are then separated in the polarization splitter 19 so that the selected polarization components from the input port 8 exit through the output port 45, together with the components that have not been selected coming from the port 9, and the selected polarization components coming from the input port 9 exit through the output port 44, together with the components that have not been selected coming from the port 8. The signals, that in the conversion stage 20 are subjected to a conversion-polarization, are guided in the completely cross-state, producing the function of total switching.

With the conversion-polarization in the compensation stage 10, the polarization components TE and TM are subjected to a frequency shift whose sign depends on the polarization as well as on the direction of propagation of the acoustic wave in relation to the optical wave, according to the following diagram:

| Polarization | collinear | Propagation contralinear |
| --- | --- | --- |
| TE | + | − |
| TM | − | + |

Moving to the conversion stage 20, on condition that the second acoustic wave is propagated in the same direction and with the same frequency as the first, the frequency shift is compensated by the return conversion to the original polarization state.

In order for the first and the second acoustic wave to have the same frequency, it is preferable that a single electrical driving signal be supplied to both the electro-acoustic transducers 14 and 36.

The switch of FIG. 1 is symmetrical, in the sense that it operates correctly if the input ports 8 and 9 and the output ports 44 and 45 are interchanged and the second operate as input ports, while the first operate as output ports.

Figure 2:
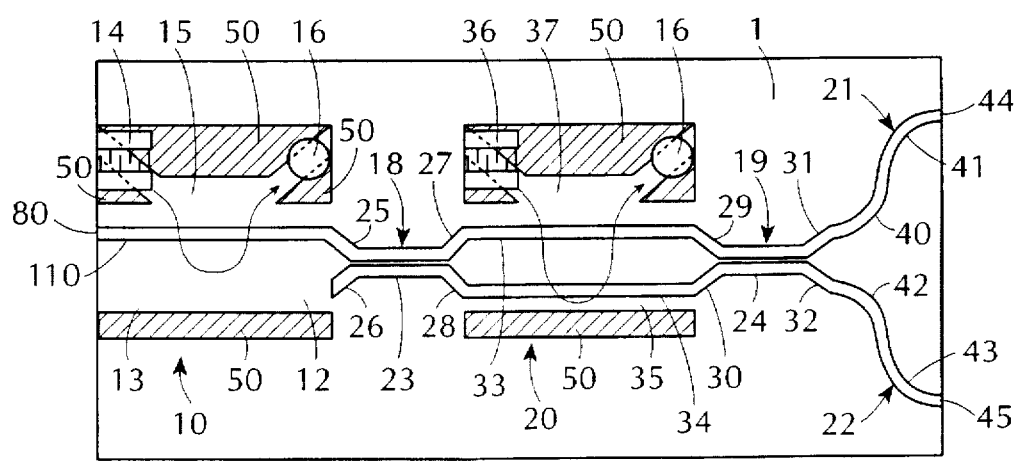
FIG. 2 shows a variant of the switch of FIG. 1.

As shown in FIG. 2, if the curved portions 4, 5, 6 and 7 and the optical waveguide 12 of the switch of FIG. 1 are eliminated, a 1×2 switch (demultiplexer) can be made with the waveguide branch 110 that forms an input port 80. In a variant, the switch of FIG. 2 operates as a 2×1 switch (multiplexer) if ports 44 and 45 are used as input ports.

Figure 3:
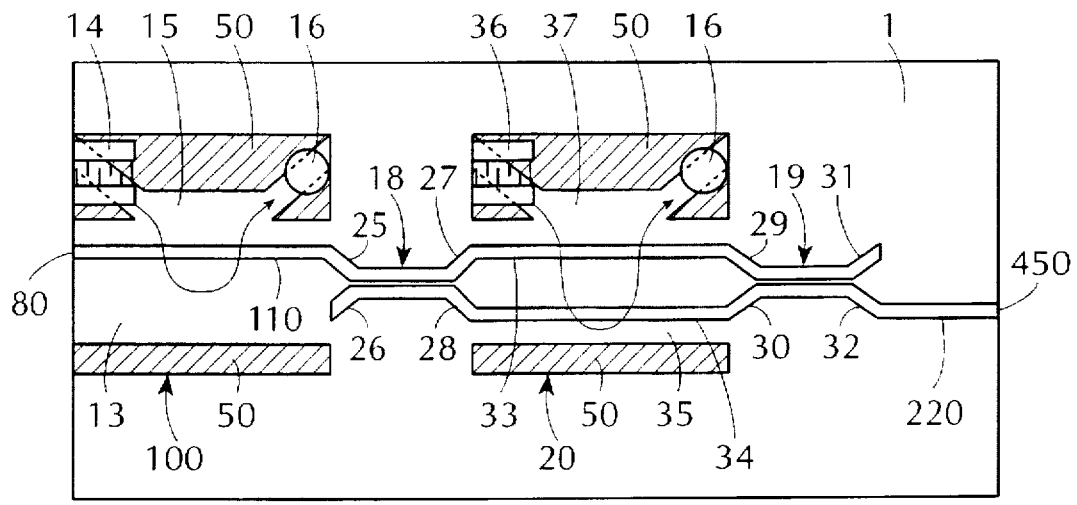
FIG. 3 is a diagrammatic representation of a tunable acousto-optical filter, with a polarization independent response, made according to the invention.

There is shown in FIG. 3 an acousto-optical filter tunable, having a polarization independent response, made according to the invention. The filter of FIG. 3 has some parts that are identical with those of the switch of FIG. 2, that are indicated with the same numbers. The filter comprises a substrate 1 of a birefringent and photoelastic material, consisting of lithium niobate ($LiNbO_3$) wherein there are a compensation stage 100, two polarization selective elements 18 and 19 a conversion stage 20 and an output waveguide branch 220.

The compensation stage 100 comprises an optical waveguide branch 110, that forms an input port 80 capable of being connected to an optical fiber of a telecommunications network, an acoustic waveguide 13, containing the branch 11, and an electro-acoustic transducer 14, capable of generating a radio-frequency surface acoustic wave. The transducer 14 is placed in an acoustic waveguide 15 side by side and communicating with the acoustic waveguide 13. At ends of the acoustic waveguide 15 there are acoustic absorbers 16. The output waveguide branch 220 is connected to the output waveguide 32 of the polarization splitter 19 and it forms an output port 450, capable of being connected to an optical fiber of a telecommunications network.

When the filter is in the off-state, it is in a condition of direct transmission and the optical signals entering through port 8 are addressed in the waveguide 31 of the polarization splitter 19 and they can be absorbed by means of an optical absorber not shown. Applying an appropriate voltage across the electrodes of transducers 14 and 36, through the mode conversion with the polarization components combined in stage 100 and the mode conversion with the polarization components separated in the conversion stage 20, the optical signals are selected having a wavelength corresponding to the acoustic driving frequency. The selected signals are addressed from the input port 8 of the compensation stage 100 to the output port 450 in a condition of cross-transmission and the filter operates as a tunable pass band.

The filter has the advantage of a very simple architecture and of a functionality that is better than that of a conventional acousto-optical filter with one conversion stage especially due to the absence of frequency shift. With a calibrated acousto-optical coupling, the filter has, mainly, a small bandwidth ($\leq 2$ nm) and low values of cross-coupling (-20 dB).

The filter has a very low overall loss ($\approx 1.5$ dB).

The switch and the filter of FIGS. 1 and 2 are capable of operating at room temperature with a band of optical wavelengths at least 100 nm wide centered on a wavelength of 1550 nm or of 1300 nm, that are particularly interesting for optical telecommunications.

The substrate 1 consists of a crystal of $LiNbO_3$ cut perpendicularly to the x-axis. The waveguides 11, 12, 23, 24, 33, 34 and 110 are oriented along the crystal's y-axis. Instead of the $LiNbO_3$, another birefringent, photoelastic and piezoelectric material may be used, selected from the group $LiTaO_3$, $TeO_2$, and $CaMoO_4$. The overall length of the devices is about 40–50 mm.

The acoustic waveguides 13, 15, 35 and 37 of the switch and of the filter of FIGS. 1 and 2 can be made by means of a photolithographic mask circumscribing the strips 50 of the substrate 1, so as to obtain a width of 110 microns for the acoustic waveguides 13, 15, 35, and 37. Inside the surface circumscribed by the openings of the mask a deposition has been executed of a layer of Ti with a thickness of 160 nm as well as a subsequent diffusion of Ti in the substrate for 31 hours in an oven at a temperature of 1060° C. Due to the effect of the diffusion, the speed of the acoustic waves is increased by about 0.3%, so that the areas 50 act by confining the acoustic waves along the waveguides 13, 15, 35, and 37.

The optical waveguides and the polarization splitters can be made by diffusion in the substrate of a substance capable of raising the refraction index. By using a photolithographic, it is possible to obtain a deposition of a layer of Ti having a thickness of about 120 nm and a subsequent diffusion for 9 hours at a temperature of 1030° C. At the optical waveguides, the mask has an aperture having a width of about 7 microns.

The optical and acoustic waveguides are preferably monomodal for the optical and acoustic waves used.

The interdigital electrodes of the electro-acoustic transducers 14 and 36 are deposited in the (piezoelectric) substrate 1, with an inclination of about 5° with respect to the y-axis. Preferably, the transducers comprise 15–20 or more pairs of interdigital electrodes with a periodicity of about 20.8 microns. Preferably, the electrodes have a variable pitch (chirp) to widen the response band. The value of the periodicity derives from the value of the wavelength in the $LiNbO_3$ of a acoustic surface wave with a frequency of about 173.5 MHz, which is the value necessary for the TE<->TM conversion at an optical wavelength of some 1550 nm. By changing the periodicity of the electrodes it is possible to have transducers suitable for acousto-optical devices operating in other wavelength bands. The electrodes can be made by depositing on the substrate a metallic layer, say aluminum, with a thickness of 500 nm.

It is possible to tune the acousto-optical device at the wavelength of 1500 nm or 1600 nm, shifted by 50 nm with respect to the central wavelength of 1550 nm, by supplying the interdigital electrodes with a power of about 100 mW, against the (about) 50 mW called for by operations at the central wavelength.

Figure 4:
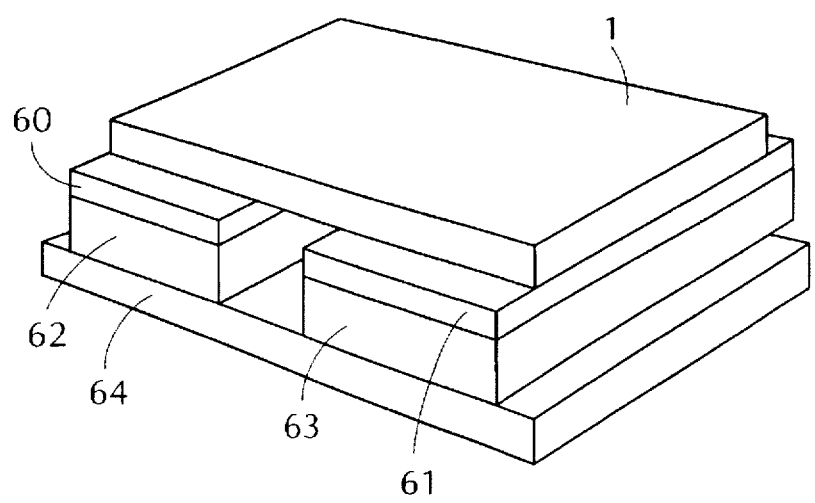
FIG. 4 shows elements for temperature adjustments applied to the switch or to the filter of FIGS. 1 and 2.

There is shown in FIG. 4 an acousto-optical device, switch or filter, wherein, at the compensation stage 10, or 100, and at the conversion stage 20, to the substrate 1 there are applied two small copper plates 60 and 61 and two Peltier cells 62 and 63, supported by a base 64, that act as temperature adjustment elements. By means of the Peltier cells it is possible to change the temperature of the stages 10, or 100, and 20 so as to compensate for the lack of homogeneity both of the material of the substrate 1 and of the material that defines the optical waveguides and to correct errors in the parameters of the optical waveguides.

I claim:

1. An acousto-optical waveguide device, selective in wavelength, independent of the polarization, comprising a substrate in a birefringent and photoelastic material, on which there are obtained:

a) at least one polarization mode conversion stage of an optical signal in a preselected range of wavelengths, including a1) a first and a second optical waveguide substantially parallel to one another and placed at a preselected distance, a2) first generating means of an acoustic surface wave associated with said first and second optical waveguide and a3) a first acoustic waveguide containing at least one portion of said first and second optical waveguide, a4) each of said first and second optical waveguide being capable of receiving one of two mutually orthogonal polarization components of said optical signal and being capable of emitting a respective component of orthogonal polarization, b) a first and a second polarization selective element placed upstream and downstream, respectively, of said conversion stage and optically connected to said first and second waveguide in order to transmit said two polarization components separately;

characterized in that in said substrate there is also obtained c) at least one compensation stage for the conversion of the polarization mode of said optical signal in said preselected range of wavelengths including c1) at least one third optical waveguide optically connected to one of said first and second polarization selective element, c2) second generating means of an acoustic surface wave, associated with said third optical waveguide, and c3) a second acoustic waveguide containing at least one portion of said third optical waveguide, c4) wherein said third optical waveguide is connected serially to said conversion stage of the polarization mode, and c5) said third optical waveguide guides said two polarization components in a combined form.

2. An acousto-optical device according to claim 1, characterized in that said compensation stage further includes d) a fourth optical waveguide substantially parallel to said third optical waveguide and placed at a preselected distance from it, d1) said fourth optical waveguide being optically connected to one of said first and second polarization selective element, d2) said second generating means of an acoustic surface wave being associated with said fourth optical waveguide, d3) said second acoustic waveguide containing at least one portion of said fourth optical waveguide, d4) said third and fourth optical waveguide being connected to respective optical access waveguide branches separated and spaced at least by the amount of said third and fourth optical waveguide so that each of said third and fourth optical waveguide guides said two polarization components in a combined form.

3. An acousto-optical device according to claims 1 or 2, characterized in that said first and second optical waveguide and said third and fourth optical waveguide are spaced by about 40 microns.

4. An acousto-optical device according to claim 3 characterized in that said first and second acoustic waveguides have a width of about 110 microns.

5. An acousto-optical device according to claim 2, characterized in that each of said optical access waveguide branches comprises two portions curved with opposite convexity.

6. An acousto-optical device according to claims 1 or 2, characterized in that said second polarization selective element is connected to optical output waveguide branches each comprising two portions curved with opposite convexity.

7. An acousto-optical device according to claim 6, characterized in that said portions of optical waveguides are curved according to an arc of a circle having a radius of curvature ranging from 100 to 180 mm.

8. An acousto-optical device according to claims 1 or 2, characterized in that, at at least one of said compensation stage and conversion stage, adjustment elements are applied to said substrate capable of varying the temperature of at least one of said compensation and conversion stages, in order to compensate for the nonhomogeneous birefringence of the material of said substrate and of said optical waveguides.

9. An acousto-optical device according to claim 8, characterized in that said adjustment elements comprise two small copper plates and two Peltier cells applied to said substrate.

10. An acousto-optical device according to claims 1 or 2, characterized in that said first and second generating means of an acoustic surface wave each comprises an electro-acoustic transducer, formed by interdigital electrodes, capable of generating a radio frequency surface acoustic wave.

11. An acousto-optical device according to claim 10, characterized in that said electro-acoustic transducer is placed in an acoustic waveguide, side by side and communicating with one of said first and second acoustic waveguide so as to form an acoustic coupler having a preselected interaction length.

12. An acousto-optical device according to claim 10, characterized in that it comprises two electro-acoustic transducers supplied by a common driving signal.

13. A method of acousto-optical processing of an optical signal comprising:

a first polarization conversion step comprising the steps of:
  separating the polarization components of an optical signal into two different waveguide paths;
  converting the separated polarization components of said optical signal in both said paths by means of acousto-optical interaction with a first common acoustic wave; and
  combining said polarization components of said optical signal; and a second polarization conversion step comprising the step of converting the non-separated polarization components of said optical signal by means of acoustic interaction with a second common acoustic wave, wherein said second acoustic wave has a frequency equal to said first acoustic wave and wherein said first polarization conversion step is performed serially with said second polarization conversion step.

14. A method according to claim 13 further comprising fine tuning the converting step of at least one of said first and second polarization conversion steps by adjusting the temperature of a substrate carrying said waveguide paths.

15. A method according to claim 13, characterized in that in the first polarization conversion step said step of converting by means of acousto-optical interaction comprises supplying a first electrical signal at a given frequency to a first electro-acoustic transducer, and in said second polarization conversion step said step of converting by means of acousto-optical interaction comprises supplying a second electrical signal at the same said given frequency to a second electro-acoustic transducer.

16. A method according to claim 15, characterized in that a single electrical signal at a given frequency is supplied to both said first and second electro-acoustic transducer.

17. A method of acousto-optical processing of an optical signal comprising:

a first polarization conversion step comprising the steps of:
  separating the polarization components of an optical signal into two different waveguide paths;
  converting the separated polarization components of said optical signal in both said paths by means of acousto-optical interaction with a first common acoustic wave; and
  combining said polarization components of said optical signal;

a second polarization conversion step comprising the step of converting the non-separated polarization components of said optical signal by means of acoustic interaction with a second common acoustic wave, wherein said second acoustic wave has a frequency equal to said first acoustic wave and wherein said first polarization conversion step is performed serially with said second polarization conversion step; and fine tuning the converting step of at least one of the first and second polarization conversion steps by adjusting the temperature of a substrate carrying said waveguide paths.

* * * * *